Patented May 16, 1933

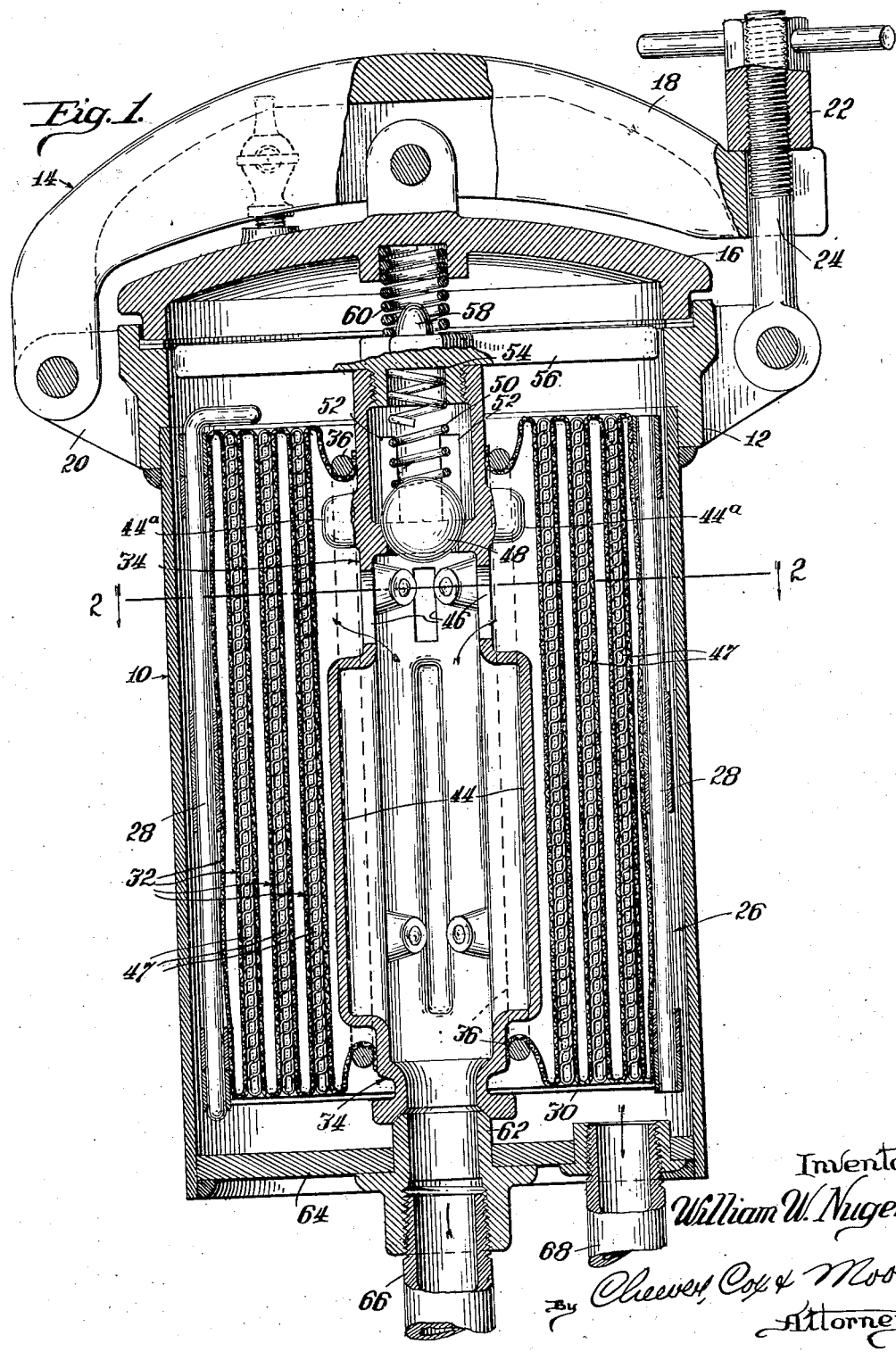

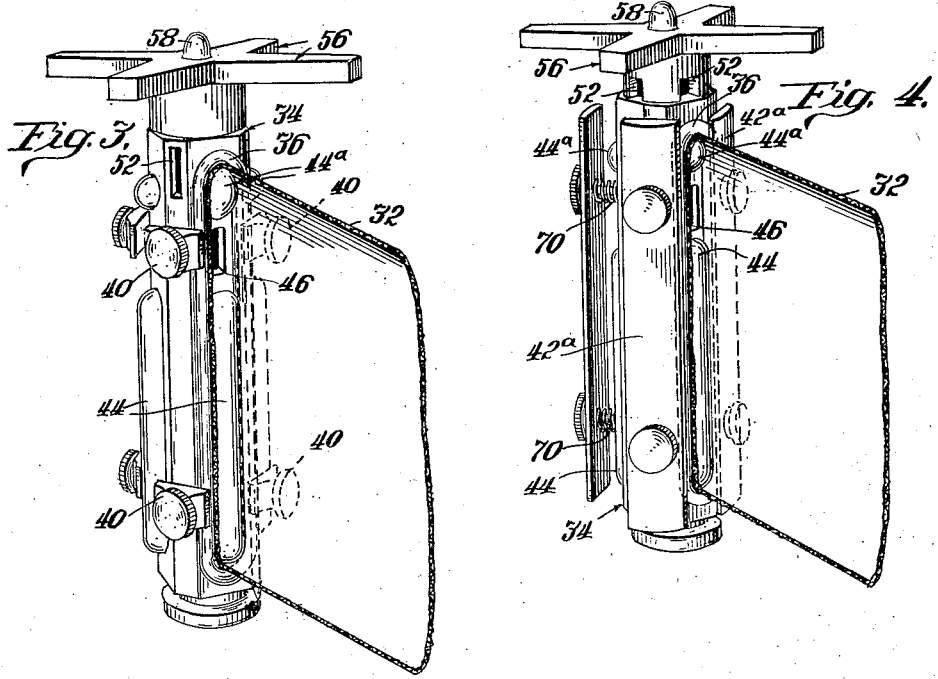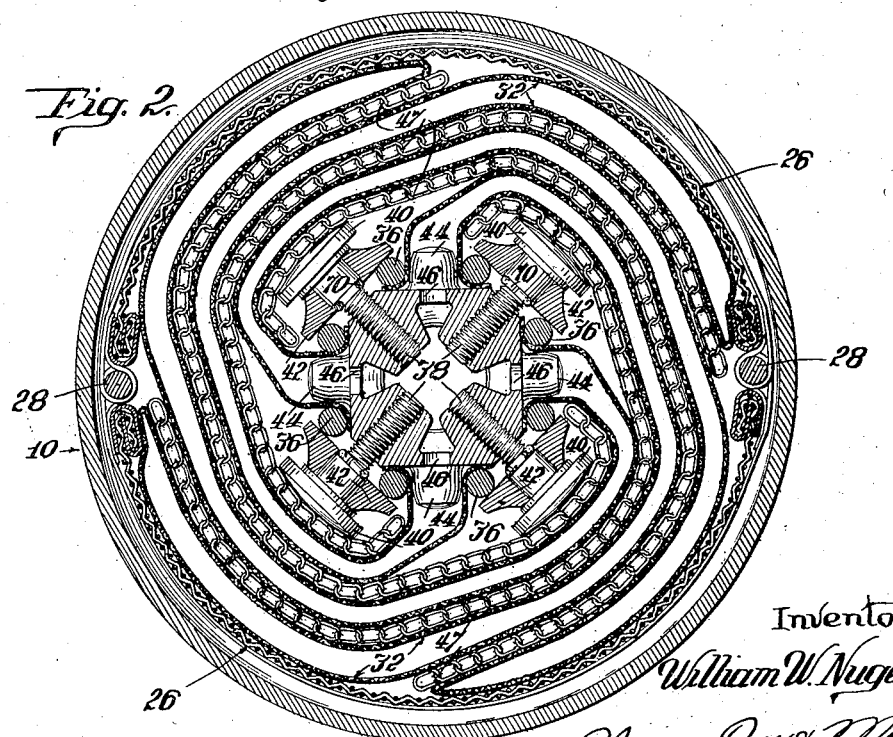

1,909,308

UNITED STATES PATENT OFFICE

WILLIAM W. NUGENT, OF CHICAGO, ILLINOIS

PRESSURE FILTER

Application filed August 1, 1931. Serial No. 554,516.

My invention relates generally to filters and more particularly to devices which are adapted to filter fluid under pressure.

One of the objects of my present invention is to provide a pressure filter of improved practical construction, in which a plurality of filter bags may be clamped in position about a central support in a very convenient and effective manner.

Another object of my invention is to provide a device as set forth above having improved means for maintaining the mouth of the filter bags open, and to this end I propose to provide, in combination with clamping rings, spacers which extend between the rings and effectively serve to maintain the mouth of the bags open at the point where the oil to be filtered enters said bag.

Still another object of my invention is to provide a support for holding a plurality of filter bags in proper relation within a container, said support being of simplified unitary construction and readily removable from the container.

Still another and more specific object of my invention is to provide new and effective means for centering the device which supports the open ends of the filter bags.

The foregoing and numerous other objects and advantages will be more apparent from the following detailed description when considered in connection with the accompanying drawings, wherein—

Figure 1 is a vertical sectional view taken centrally of a pressure filter which represents one embodiment of my invention;

Figure 2 is a horizontal sectional view of the device taken substantially along the line 2—2 of Figure 1;

Figure 3 is a perspective view of the filter unit, a portion of one of the filter bags being broken away to more clearly disclose certain structural features otherwise hidden; and Figure 4 is a perspective view similar to Figure 3, disclosing a modified form of clamping means for securing the clamping rings in position against the open portions of the filter bags.

Referring now to the drawings more in detail, wherein like numerals have been employed to designate similar parts throughout the various figures, it will be seen that one embodiment of my invention includes a cylindrical casing 10. The upper portion of the casing 10 supports the annular lower section 12 of a cover device designated generally by the numeral 14. This device 14 includes a cover proper 16 which is adapted to be clamped against the upper annular surface of the section 12 through the medium of a clamping arm 18, which is pivoted to a bracket 20 and also pivotally supports the central portion of the cover 16. A suitable clamping nut 22 mounted upon a screw 24 serves to secure the clamping arm 18 in position, as shown in Figure 1.

Mounted within the casing 10 is a cage 26, Figure 2, formed of two semi-cylindrical sections hinged together at 28. This cage 26 also includes a bottom plate 30 which serves as a support for a plurality of filter bags 32. The cage 26 does not form a part of the present invention, except as it enters into the general combination, and for a more detailed description of the cage structure, reference is made to my copending application, Serial No. 528,292, filed April 7, 1931. The open end or mouth of each filter bag 32 is adapted to be clamped against the flat outer surface of a multi-sided central support or column 34 by means of oblong clamping rings 36. The corner sections of the central support or column 34 are positioned within the rings 36, as clearly shown in Figure 2, so that the elongated vertical sections of each clamping ring bear against the outer face surface of the column 34. The rings 36 are adapted to be secured in position by means of suitable clamping screws 38, which screws include an outer knob 40 adapted to be manually manipulated. Each of the screws 36 carries a clamping member 42 which, in one position as shown in Figures 2 and 3, is adapted to extend across and clampingly bear against outer portions of the rings 36. The clamping members 42 are of such a width that when they are rotated ninety degrees from the position shown in Figures 2 and 3, they will pass through the ring 36 and thereby permit of the convenient lateral displacement of the rings to facilitate the removal of the filter bags for cleaning, etc. The rings 36 when urged inwardly by the members 42, which bear directly against said rings, serve to securely clamp the margins of the filter bags against the flat side wall or surface of the column 34.

Attention is directed to the fact that I provide elongated spacers 44 and relatively short spacers 44a which extend laterally of and are formed integral with each side of the column 34. These spacers cooperate with the clamping rings 36 to maintain the mouth of the bags open so as to permit the unobstructed flow of oil into said bags. It will be noted that oil from within the column 34 passes outwardly, as indicated by the arrows in Figure 1, through ports 46, which are positioned between the spacers 44 and 44a. These spacers extend outwardly from the column a distance which is greater than the thickness of the rings 36, and thereby serve to effectively prevent the wall of the filter bag from being forced inwardly into sealing relation with respect to its companion port 46. The spacers 44 and 44a not only serve to maintain the area adjacent the ports 46 open, but also the area along the entire mouth of each companion filter bag. Flexible inserts 47 are interposed between adjacent bags to maintain the separation thereof while under pressure.

The upper end of the column 34 supports a ball valve 48 which is normally seated through the action of a coiled spring 50 to prevent communication between the chamber within the column and discharge ports 52. The upper end of the coiled spring 50 is mounted within a socket or seat 54 provided within a spider 56. The arms of the spider 56 may be conveniently gripped so as to withdraw the entire filter unit from the cage 26 when the cover 16 is open. Extending upwardly from the central portion of the spider member 56 is a projection or knob 58, and this knob cooperates with a heavy duty coiled spring 60 to maintain the filter unit in proper vertical alinement within the casing 10. The lower end of the column 34 is seated upon an annular bearing 62 which extends upwardly through a bottom section 64 of the casing.

Fluid or oil to be filtered enters through a pipe 66, which communicates with the annular bearing 62 and the chamber of the column 34, and this fluid passes outwardly through the ports 46 into the various filter bags 32. Fluid which filters through the bags is withdrawn from the bottom of the casing through a suitable pipe 68.

In Figure 4 I have disclosed a modified clamping arrangement wherein a plurality of elongated clamping members 42a are employed in place of the members 42 described above. Each of the members 42, like the members 42a, has associated therewith a coiled spring 70 which serves to urge the clamping members outwardly against the inner surface of the companion knobs 44. By employing the elongated clamping members 42a, a more effective clamping force may be exerted against the rings 36.

From the foregoing it will be apparent that my invention contemplates the provision of a filtering device which is very practical in construction, and which is so arranged that the filtering unit, including the central column 34, the filter bags 32, and associated clamping mechanism, may be very conveniently removed from the cage 26. The spacer members 44 and 44a cooperate with the clamping rings 36 to maintain the mouths of the bags open when fluid under pressure is delivered thereto, and said rings, in bearing against the side walls of the central column, through the action of the clamping screws 38, provide a very effective sealing means. The unitary or integral construction of the upper end of the central column 34 makes for rigidity and expedites the removal of the entire filter unit.

Obviously numerous structural changes and modifications may be made without departing from the spirit of my present invention, and the same should be limited only by the scope of the appended claims.

Having thus described my invention, what I claim as new and desire to secure by Letters Patent is:

1. A filtering mechanism comprising a casing adapted to retain fluid under pressure, a central column having a longitudinal fluid conducting passageway therein extending axially of the casing, said column being detachably mounted within said casing, a plurality of ports for directing fluid from said passageway, filter bags having the mouths thereof registering with said ports, a clamping member for holding the mouth of each bag over said port, and means for directly engaging the outer surface of said clamping member so as to cause the inner surface of said member to bear against the external margin of said filter bag at the mouth thereof and thereby clamp said margin against the external surface of said column.

2. A filtering mechanism including a casing for retaining fluid under pressure, a central column having a longitudinal passageway therein for receiving fluid under pressure, said column being multi-sided and provided with a plurality of ports for directing fluid from said passageway to a point externally thereof, a filter bag companion to each port and having the mouth thereof covering said port, a clamping member adapted to engage the external margin of each bag at the mouth thereof so as to clamp said margin against the companion external surface of said column, and means for simultaneously engaging a section of one clamping member and a section of the next adjacent clamping member, whereby all of said members may be positively clamped to seal the mouths of the filter bags against the external surfaces of the column.

3. A filtering mechanism including a casing for retaining fluid under pressure, a central column having a passageway for receiving fluid under pressure, said column being detachably mounted within said casing and having a port for directing fluid from said passageway, a filter bag having the mouth thereof positioned over said port, a clamping member conforming in shape with the shape of the mouth of said filter bag and adapted to engage the external margin of said bag at the mouth thereof, and means positioned externally of the bag and adapted to directly engage the external surface of said clamping member for securing the mouth of the filter against said column.

4. A filtering mechanism including a casing for retaining fluid under pressure, a central column having a passageway for receiving fluid under pressure, said column being detachably mounted within said casing and having a port for directing fluid from said passageway, a filter bag having the mouth thereof positioned over said port, an elongated clamping ring conforming in shape with the shape of the mouth of said filter bag and adapted to engage the external margin of said bag at the mouth thereof, and means positioned externally of the bag and adapted to directly engage the external surface of said clamping ring for securing the mouth of the filter against said column.

5. A filtering mechanism including a casing, a cover member adapted to be sealed against the open end of said casing to retain fluid under pressure within said casing, a filter unit mounted within said casing including a central column having an aperture for receiving fluid under pressure and a plurality of filter bags spaced around said column for receiving fluid under pressure from said passageway, a check valve at the upper end of said column to provide relief when the pressure within the column exceeds a predetermined amount, said valve including a spring and a valve member normally seated by said spring, and a member secured to the upper end of said column and providing a seat for one end of said spring, said member providing means adapted to be manually gripped for lifting the filter unit from the casing when the cover member has been shifted to its open position.

6. A filtering mechanism including a casing, a cover member adapted to be sealed against the open end of said casing to retain fluid under pressure within said casing, a filter unit mounted within said casing including a central column having an aperture for receiving fluid under pressure and a plurality of filter bags spaced around said column for receiving fluid under pressure from said passageway, a check valve at the upper end of said column to provide relief when the pressure within the column exceeds a predetermined amount, said valve including a spring and a valve member normally seated by said spring, a member secured to the upper end of said column and providing a seat for one end of said spring, said member providing means adapted to be manually gripped for lifting the filter unit from the casing when the cover member has been shifted to its open position, a coiled spring adapted to bear against said member when the cover for the casing is closed, and a centering projection carried by said member and extending upwardly therefrom into the central portion of said coiled spring.

7. A filtering mechanism including a casing, a cover member adapted to be sealed against the open end of said casing to retain fluid under pressure within said casing, a filter unit mounted within said casing including a central column having an aperture for receiving fluid under pressure and a plurality of filter bags spaced around said column for receiving fluid under pressure from said passageway, a check valve at the upper end of said column to provide relief when the pressure within the column exceeds a predetermined amount, said valve including a spring and a valve member normally seated by said spring, and a member secured to the upper end of said column and providing a seat for one end of said spring, said member having radial arms adapted to be manually gripped for lifting the filter unit from the casing when the cover member has been shifted to its open position.

8. A filtering mechanism including a casing adapted to retain fluid under pressure, a central column within said casing having a longitudinal passageway for receiving fluid under pressure, said column having a port for directing fluid from said passageway, a filter bag having the mouth thereof superimposing said port, said mouth being elongated and adapted to be clamped against the external surface of said column, an oblong clamping ring adapted to clamp the outer marginal surface of the filter bag mouth against the outer surface of said column, and spacer means arranged at spaced points about said port and projecting outwardly from said column into the mouth of said bag a distance which is greater than the thickness of said oblong clamping ring, whereby to prevent the sealing of the bag against said ring if and when said bag is wrapped about said column and thereby maintain communication between the passageway in the column and the area within the filter bag.

9. In a filter unit, the combination with a casing, of a filter element removably arranged within said casing comprising a central conduit, a filter element wrapped about said conduit, a port in the bottom of said casing communicating with said conduit when said filter element is in place within said casing, a cover for said casing, means at the upper end of said conduit removably secured to said conduit having spaced radial arms extending outwardly toward the inner walls of said casing to hold said central conduit in spaced relation to the sides of said casing, and yielding means for holding said filter unit in place when said cover is in operative position over the open side of said casing and for pressing said conduit into frictional contact with the area of said casing surrounding said port whereby a liquid-tight communication is formed between said conduit and port.

10. In a filter unit, the combination with a casing, of a filter element removably arranged within said casing comprising a central conduit, a filter element wrapped about said conduit, a port in the bottom of said casing communicating with said conduit when said filter element is in place within said casing, a cover for said casing, means at the upper end of said conduit having spaced radial arms extending outwardly toward the inner walls of said casing to hold said central conduit in spaced relation to the sides of said casing, and yielding means for holding said filter unit in place when said cover is in operative position over the open side of said casing and for pressing said conduit into frictional contact with the area of said casing surrounding said port whereby a liquid-tight communication is formed between said conduit and port.

11. In a filter, the combination with an outer casing having one open side, and inlet and outlet ports communicating with the interior of said casing, a cover for said casing, a filter bag, means about which said filter bag is wrapped comprising a central conduit closed at one end thereof and having spaced radial arms extending outwardly toward the sides of said casing to hold that end of said conduit in proper spaced relation centrally of said casing, a cooperating seat at one end of said conduit adapted to cooperate with a seat surrounding one of said ports, said last mentioned port being arranged substantially centrally of said casing, and spring means between said cover and the upper end of said conduit operable to urge said conduit in a direction downwardly toward the lower end of said casing when said cover is in operative position whereby said seats are maintained in proper cooperation with each other to form a leak-proof passage from said conduit to said port, said conduit having an opening therein communicating with said filter bag.

12. In a filter unit, the combination with a casing and a filter element arranged within said casing including a member for supporting the filtering element, and spaced radial arms adapted to be grasped by the operator for removing the filter element from said casing, said arms acting also as means for spacing said filter elements in proper spaced relation to the sides of said casing.

13. In a filter, the combination with a casing and a filter unit arranged within said casing comprising a central conduit, spaced openings in said conduit arranged peripherally there-about, clamping surfaces on the outside of said conduit extending laterally away from said openings, filter bags adapted to be arranged over said openings with their mouths in communication therewith, and clamping elements encircling the mouths of each of said filter bags with a portion of the material adjacent the peripheral edge of said mouths arranged between the respective clamping element for that filter bag and the clamping surface surrounding the opening with which the filter bag communicates, and fastening means for holding said clamping elements in proper operative position against said surfaces comprising headed members arranged between adjacent elements and adapted to straddle portions of each of adjacent elements.

14. In a filter, the combination with a casing and a filter unit arranged within said casing comprising a central conduit, spaced openings in said conduit arranged peripherally there-about, clamping surfaces on the outside of said conduit extending laterally away from said openings, filter bags adapted to be arranged over said openings with their mouths in communication therewith, and clamping elements encircling the mouths of each of said filter bags with a portion of the material adjacent the peripheral edge of said mouths arranged between the respective clamping element for that filter bag and the clamping surface surrounding the opening with which the filter bag communicates, and fastening means for holding said clamping elements in proper operative position against said surfaces comprising headed members arranged between adjacent elements and adapted to straddle portions of each of adjacent elements, said headed clamping elements comprising turnable members of sufficient dimension in one direction to straddle portions of adjacent clamping elements and being of sufficient dimension in a direction transverse to said first dimension to permit said clamping elements to be removed when said headed elements are turned to cause the narrower dimension thereof to extend in a direction transverse to said adjacent elements.

In witness whereof, I have hereunto subscribed my name.

WILLIAM W. NUGENT.